April 5, 1960  E. L. CHAFFEE  2,932,021
GROUND SURVEY SYSTEM
Filed June 19, 1956  4 Sheets-Sheet 1

INVENTOR.
EMORY LEON CHAFFEE

April 5, 1960     E. L. CHAFFEE     2,932,021
GROUND SURVEY SYSTEM

Filed June 19, 1956     4 Sheets-Sheet 2

INVENTOR.
EMORY LEON CHAFFEE

April 5, 1960  E. L. CHAFFEE  2,932,021
GROUND SURVEY SYSTEM
Filed June 19, 1956  4 Sheets-Sheet 3

INVENTOR.
EMORY LEON CHAFFEE

United States Patent Office 2,932,021
Patented Apr. 5, 1960

2,932,021

GROUND SURVEY SYSTEM

Emory Leon Chaffee, Belmont, Mass., assignor to John Hays Hammond, Jr., Gloucester, Mass.

Application June 19, 1956, Serial No. 592,280

3 Claims. (Cl. 343—15)

This invention relates to systems for surveying and reconnaissance and more specifically to a system employing radar for recording the position coordinates of an airplane at the instant a special event takes place at the airplane.

When an airplane is used for reconnaissance, surveillance, surveying and mapping, or other technical or strategic purposes by flying over a certain area of the earth's surface generally one or more special events take place at the airplane such as photographing or otherwise recording information concerning the earth's surface below the airplane, releasing a bomb or other device, or recording weather conditions. It is then usually important to know the position of the airplane when each of the special events takes place.

The invention here described provides a system for accurately determining and recording the position of the airplane for each event and for identifying the position record with the record of the corresponding event.

The invention has two embodiments according to whether the record of the special events at the airplane is made at a ground station or in the airplane.

The first embodiment of the invention applies to systems in which the information gathered at the airplane is transmitted by radio or television to a ground station where the information is recorded.

The position indicator for the first embodiment is also located at the ground station. A tracking radar, similar to the radar used in anti-aircraft gun-control system, maintains a fix on the airplane at all times during its course. The radar gives directly the direction to or azimuth of the airplane, its slant range, and its elevation angle.

The azimuth and range data are transferred from the radar set to the screen of a special cathode-ray tube. The fluorescent spot of this tube is swept radially in a direction corresponding to the azimuth but the electron beam is normally blanked. The electron beam is intensified by the initial and echo pulses giving bright dots at the center of the screen and at a point distant from the center corresponding to the slant range of the airplane.

If the wave form of the radial-sweep voltage or current is automatically shaped according to the elevation angles, the distance from the center to the echo spot may be made to be proportional to the ground range instead of the slant range.

The position display on the screen of the cathode-ray tube is photographed on film when a timing pulse, which is initiated by the special event taking place at the airplane, is received at the ground station. The special event is at this time recorded on the same film by means of a second television cathode-ray tube or other suitable recording device.

The repetition frequency of the radar pulses, which provide the position coordinates, may be the same as the repetition frequency of the special events at the airplane or any other suitable frequency. However, in order to identify the position record with the corresponding special-event record, the position record and that of the special event are recorded on the same film in adjacent picture positions and the time is recorded on the margin of one of the records, or if the position and special event are recorded on separate films, the same identifying number is recorded on the margin of both records as well as the time on one of the records.

While the record of position provided by the radar cathode-ray tube is direct and graphic, the position coordinates given by it are only approximate and become less accurate as the distance of the airplane from the recording station increases.

To provide greater accuracy an additional ground station or relay station is established at a known position and a known distance from the recording station. A responder or repeater is installed at this relay station which sends a pulse to the recording station when a pulse from the recording station, reflected by the airplane, is received at the relay station. The two time intervals, first, the interval from the time the pulse is sent out from the ground station to the time the echo pulse is received from the airplane, and second, the interval from the time the pulse is sent out from the ground station to the time the relayed pulse is received from the relay ground station, are measured accurately. Knowing the time of transmission between the two ground stations and any delay time within the relay station, the slant ranges from the airplane to both ground stations can be obtained and give data for the accurate determination of the position of the airplane.

A third cathode-ray tube is used to measure and record these two time intervals. The fluorescent spot of this tube is caused to move in a circular path at a frequency such that the time the spot takes to move once around the circle is a small fraction, say one fifth of the longest time interval to be measured. The bias voltage on the grid of the third cathode-ray tube is such as practically to blank off the electron beam except when the pulses are received. The emitted pulse causes an intensification of the fluorescent spot or a radial pip and marks the beginning of both time intervals. Each echo or relay pulse received at the recording station causes a dot or pip on the circular path of the fluorescent spot. The angular positions of these two spots from the initial spot, together with a knowledge of the number of whole rotations of the blanked spot during each time interval obtained from the first position indicating cathode-ray tube, give the two time intervals from which the two slant ranges from the airplane to the two ground stations can be calculated.

To aid in determining the number of whole revolutions of the spot on the screen of the third cathode-ray tube in any time interval, circles are electronically traced on the screen of the first cathode-ray tube having radii equivalent to the number of times of rotation of the spot on the screen of the third cathode-ray tube.

The second embodiment of the invention applies to those systems in which the information gathered in the airplane is recorded in the same airplane. For this case, the slant ranges to two or more ground stations are simultaneously obtained. The position of the airplane is then calculated from these ranges, the altitude of the airplane, and the known positions of the ground stations.

A short radar pulse is periodically sent out in all horizontal directions from the airplane. The energy of the radar radiation is preferably concentrated in a thin horizontal disk-shaped pattern.

Corner reflectors or responders are installed at each ground station and they reflect or relay the pulse back to the airplane.

The time intervals corresponding to the slant ranges to the ground stations are determined by the total angle around a circular sweep in a cathode-ray tube from the spot corresponding to the emitted pulse to the spots for the received echo pulses in the same manner as described above for the first embodiment.

A plan-position indicator (P.P.I.) radar system is also installed in the airplane. The cathode-ray tube for this system displays a rough map around the airplane giving also the rough ranges and directions to the ground stations. The number of rotations made by the spot of the time measuring cathode-ray tube can be determined by the P.P.I. display as described for the first embodiment.

The photographic recording on film of the P.P.I. display and the time measuring display is made to be simultaneous with the special event at the plane by means of suitable timing pulses. Both position displays are recorded on the same film in adjacent picture positions and identified by a number or the time is recorded on the margin. The special event is recorded at the same instant the position records are made. The special event may be recorded on the same film with the position records or on a separate film identified by a suitable number recorded on the margin.

The invention also consists in certain new and original features of construction and combinations of parts hereinafter set forth.

The nature of the invention, as to its objects and advantages, the mode of its operation and the manner of its organization, may be better understood by referring to the following description, taken in connection with the accompanying drawings forming a part thereof, in which Fig. 1 is a diagram showing the course of the airplane, the ground recording station, and the relay ground station for the first embodiment of the invention.

Like reference characters denote like parts in the several figures of the drawing.

In the following description parts will be identified by specific names for convenience, but they are intended to be generic in their application to similar parts.

Figure 1:
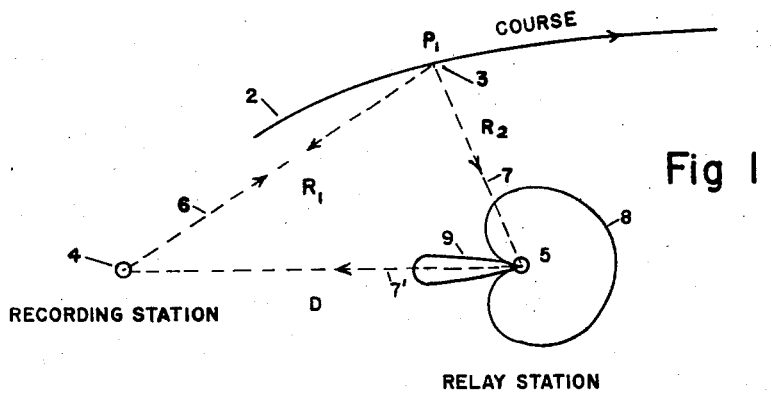

In Fig. 1, the course of the airplane is indicated; by line 2, and the instantaneous position $P_1$ of the airplane on course 2 is indicated by point 3. The recording ground station is indicated by circle 4, and the second station or the relay station is indicated by circle 5. The ground ranges $R_1$ and $R_2$ are indicated by dotted lines 6 and 7, respectively. The distance D between the ground station is indicated by dotted line 7'.

A repeater is installed at station 5 which preferably has a receiving pattern 8 and a transmitting pattern 9.

Figure 2:
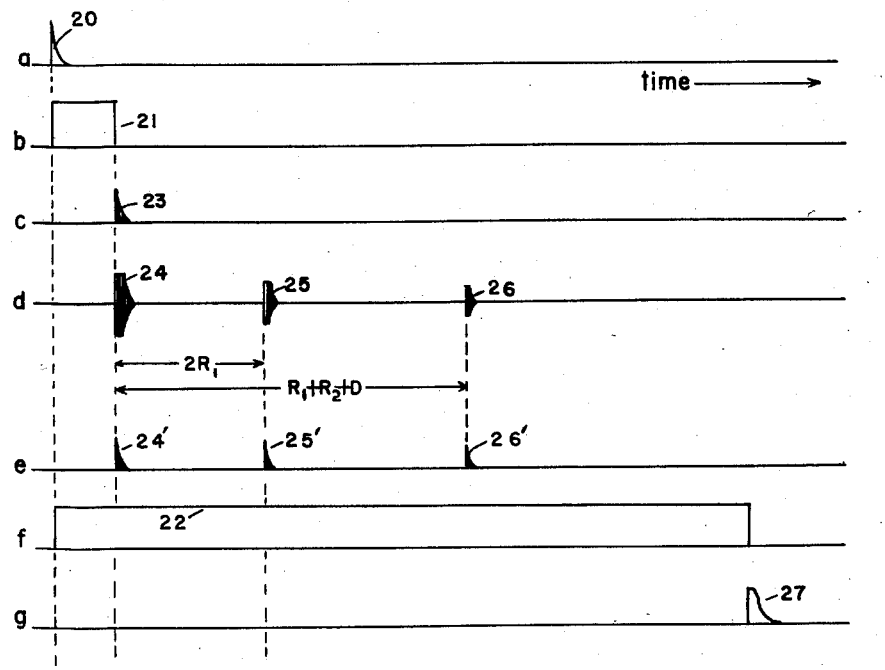
Fig. 2 is a time diagram showing certain events in the operation of the system of Fig. 1.
Figure 3:
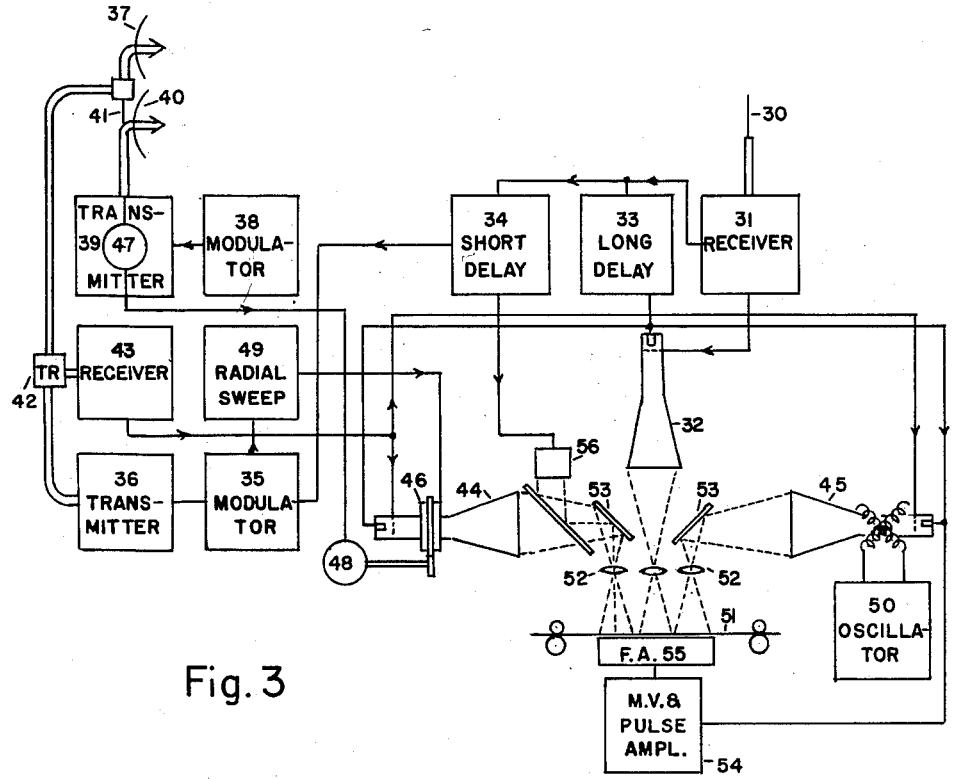
Fig. 3 is a schematic and block diagram showing the equipment in the ground recording station.

The operation of this system will be described by reference to Fig. 3 showing the equipment at the ground station, and to Fig. 2 showing a time diagram of some of the electrical pulses occurring during the operation of the system.

A marker pulse 20 in trace $a$ of Fig. 2 is sent from the airplane to station 4 a fraction of a second, such as ten microseconds, before the special event in the airplane occurs. This marker pulse may initiate the special event as it initiates the operation of the position indicating system. Pulse 20 is received by antenna 30 and receiver 31.

The special event transmitted over this radio channel is received by receiver 31 and is displayed on the screen of cathode-ray tube 32 when its electron beam is unblanked as explained later.

Pulse 20 starts two monostable multivibrators in blocks 33 and 34. The multivibrator in block 34 recovers to its normal state in a few microseconds as indicated by pulse 21 in Fig. 2. The multivibrator in block 33 recovers to its normal state in a much longer time, say a few milliseconds, as indicated by pulse 22 in trace $f$, Fig. 2.

When the multivibrator in block 34 recovers a pulse 23 is produced in block 34 which starts modulator 35, which in turn produces a radar pulse 24 from transmitter 36. This radar pulse is radiated by projector 37 which is pointed always toward the airplane by the tracking radar comprising modulator 38, transmitter 39, and projector 40. Projectors 37 and 40 are mounted on the same rotatable shaft 41 and hence point in the same direction. The frequencies of the two radar transmitters 36 and 39 are different to prevent interference between the two radar systems.

Pulse 24, leaking in small amount through TR switch 42, produces pulse 24' in receiver 43. Echo pulse 25 reflected from the airplane produces pulse 25' in receiver 43. The time between pulses 24' and 25' corresponds to $2R_1$. Pulse 26 received from the relay station 5 which has been excited by reflection of pulse 24 by the airplane, produces pulse 26' in receiver 43. The time between pulses 24' and 26' corresponds to the distance $R_1 + R_2 + D$.

Pulses 24', 25', and 26', conducted to the modulating grids of cathode-ray tubes 44 and 45, increase the intensity of the electron beam in these tubes when the electron beams are unblanked by pulse 22 from block 33.

The radial deflection yoke 46 of cathode-ray tube 44 is caused to take a position which always corresponds to the position of shaft 41 by means of servo-transformer 47 and 48 as in the well known P.P.I. systems. The radial sweep is produced by a linear sweep generator in block 49. Each radial sweep is timed by modulator 35 to start at the same instant pulse 24 is produced. Thus a radar pulse 24 and a radial sweep occurs only as often as the special event occurs, which may be at regularly spaced times or only occasionally.

The deflecting fields of cathode-ray tube 45 consist of two sinusoidally varying fields with a phase difference of ninety degrees and a period of, say, one fifth the longest time interval between radar pulse 24 and a received echo pulse. The circular path is traced only faintly on the screen of tube 45. Pulses 24', 25', and 26' cause the electron beam to increase in intensity thus producing bright dots on the circles, or radial pips may be caused by these pulses by well known techniques.

The patterns on the screens of cathode-ray tubes 44, 32, and 45 are photographically reproduced on film 51 by suitable optical systems as indicated in Fig. 3 by lenses 52 and mirrors 53.

The film remains stationary during the exposure time, which is the duration of pulse 22 in Fig. 2. The recovery at the end of pulse 22 produces in block 54 a pulse 27 in trace $g$ of Fig. 2. This pulse operates the film-advance mechanism in block 55.

Pulse 23 from block 34 momentarily illuminates a timer 56 which records on the margin of the record from tube 44 the time in hours, minutes, and seconds or an identifying number.

Figure 4:
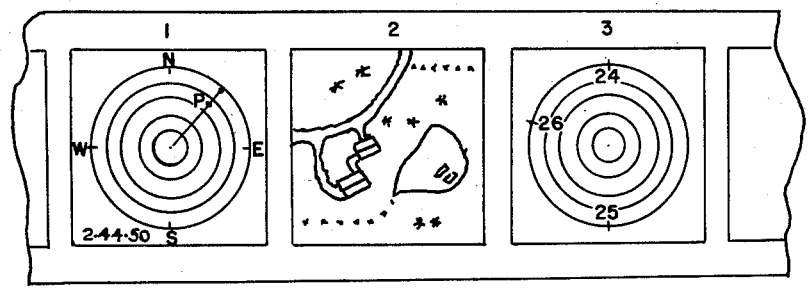
Fig. 4 is a detail view showing a portion of the film record obtained in the system of Fig. 1.

A typical record, shown in Fig. 4, frame 1, shows the P.P.I. display giving the direction of the airplane from station 4 and the two dots indicating the two time intervals to the two received pulses. The time, as 2 hours, 44 minutes and 50 seconds, is shown on the margin.

Frame 2 indicates the television view of the ground below the plane as the special event recorded by cathode-ray tube 32.

Frame 3 of Fig. 4 shows the dots on the circular path of cathode-ray tube 45 produced by pulses 24', 25', and 26'.

Figure 5:
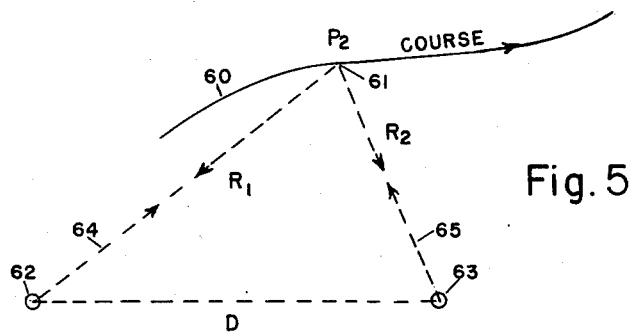
Fig. 5 is a diagram showing the course of the airplane, and the two cooperating ground stations for the second embodiment of the invention.

The second embodiment of the invention is similar in most respects to the first embodiment, but differs in that the recording is done in the airplane instead of at one of the ground stations. Figure 5 shows the course 60 of the airplane 61, and two ground stations 62 and 63. Corner reflectors or repeaters are located at both ground stations in Fig. 5. Ranges $R_1$ and $R_2$, denoted as ranges 64 and 65, are obtained directly by the time delays of pulses originating at the airplane 61 and received at airplane 61 after reflection from stations 62 and 63.

Figure 6:
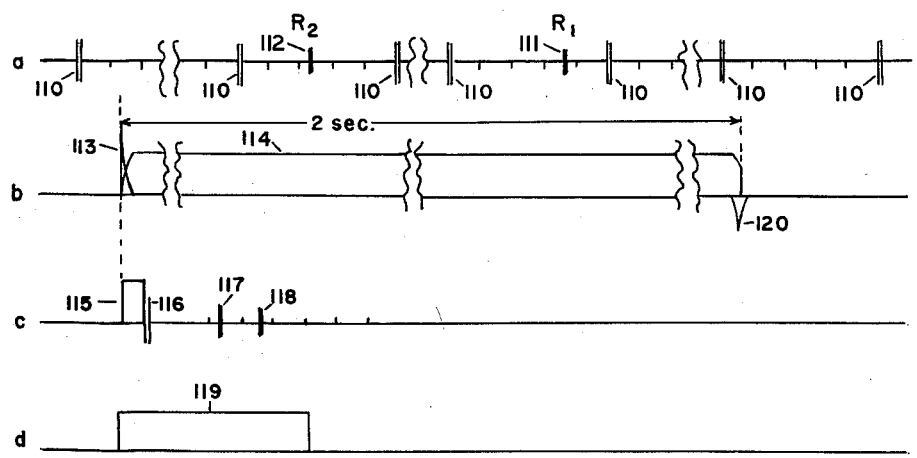
Fig. 6 is a time diagram showing certain events in the operations of the system of Fig. 5.
Figures 7, 8:
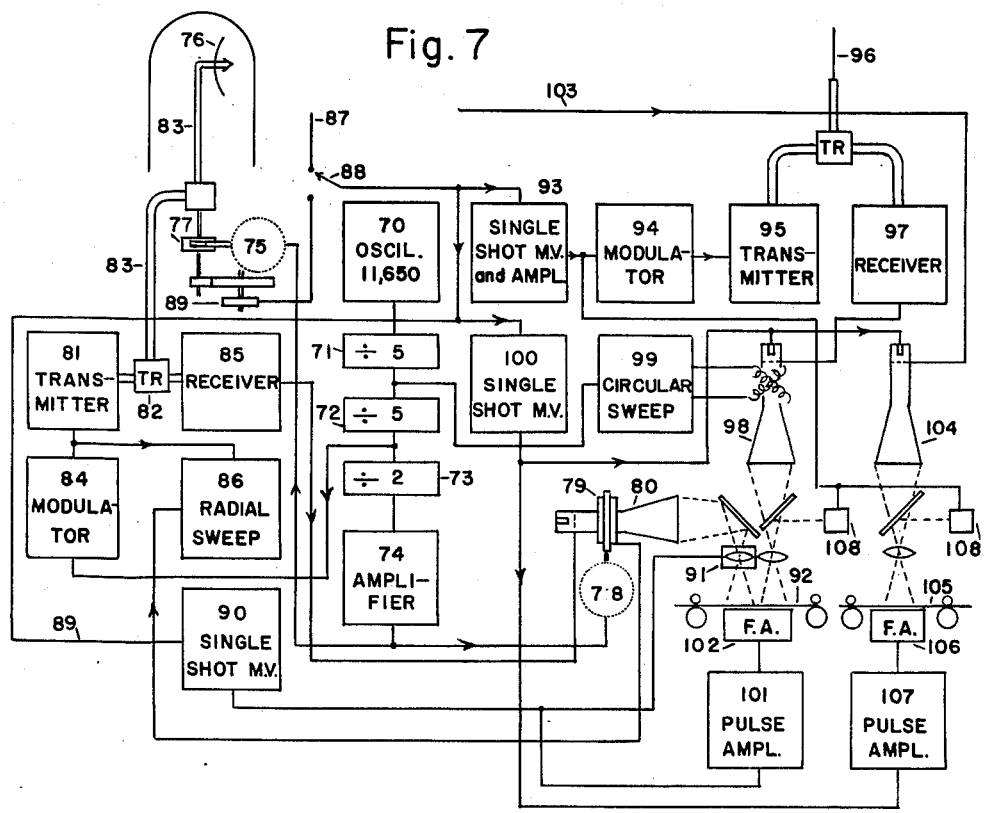
Fig. 7 is a schematic and block diagram showing the equipment in the airplane for the system of Fig. 5.
Fig. 8 is a detail view showing a portion of the film giving the position record obtained in the system of Fig. 5.

The mode of operation of the second embodiment will be described by the aid of Fig. 6 giving important wave forms in the system, and Fig. 7 showing the equipment located in the airplane.

In Fig. 7 a master control oscillator in block 70 has a constant frequency of some suitable value, such as 11,650 cycles per second. This frequency is reduced by a factor of 5 in block 71, by another factor of 5 in block 72, and by a factor of two in block 73. The output of block 73 at 233 cycles is power amplified in block 74 and then drives synchronous motor 75 which rotates, through reducing gears 77, a P.P.I. projector 76 at a speed of one revolution every two seconds. The power from block 74 also drives synchronous motor 78 which turns the radial deflection yoke 79 of the P.P.I. cathode-ray tube 80 so that yoke 79 rotates in synrchonism with projector 76.

The radar pulses of the P.P.I. system are generated by transmitter 81 and conducted to projector 76 through TR switch 82 and wave guide 83. The repetition frequency of the radar pulses is determined by an alternating voltage of 466 cycles per second taken from block 72. This alternating voltage controls the power pulses to the transmitter from a modulator in block 84. The emitted radar pulses are illustrated by pulses 110 in trace *a* of Fig. 6. There are therefore 932 radar pulses during each complete revolution of projector 76 or one pulse every 0.386 degree.

The main radar pulses leak through TR switch 82 sufficiently to produce pulses from receiver 85. Echo pulses 111 and 112 in Fig. 6, corresponding to ranges $R_1$ and $R_2$, are also produced by receiver 85. These echo pulses are not received simultaneously but one echo pulse is received when the projector 76 points in the direction of a ground station.

The radial sweep pulses for the P.P.I. display in tube 80 are generated in block 86 and are initiated by the pulses from modulator 84.

The three pulses 110, 111, and 112 from receiver 84 are impressed on the modulating grid of the P.P.I. tube 80 and produce continuously a P.P.I display on the screen of tube 80 This display may be used by the pilot for navigation.

When a special event occurs a marker pulse is produced such as pulse 113 in Fig. 6. This pulse may enter the equipment through line 87 to switch 88, or it may be produced internally by contact 89 on a commutator driven by the P.P.I. projector 76, in which case switch 88 would be turned to the lower position in Fig. 7. This marker pulse 113 starts the equipment for recording the special event and also starts the equipment for recording the position of the airplane.

The marker pulse 113, acting through line 89, trips a single-shot multivibrator in block 90 to its unstable state which is made to persist for a little more than two seconds. The unstable state of multivibrator 90 is indicated by wave form 114 in Fig. 6. This wave 114 opens shutter 91 permitting the P.P.I. display on the screen of tube 80 to be photographically recorded on film 92 during one complete revolution of projector 76. The record obtained is illustrated by the first and third frames in Fig. 8.

Marker pulse 113 also trips a single-shot multivibrator in block 93 to the unstable state which persists for a very short time, say a thousandth of a second. The unstable state of multivibrator 93 is indicated by pulse 115 in Fig. 6. The termination of pulse 115 initiates a power pulse from modulator 94 to produce in transmitter 95 a single radar pulse which is radiated by the omnidirectional antenna 96. This radar pulse, indicated as pulse 116 in Fig. 6, has a frequency different from that of the P.P.I. pulses to prevent interference between the two radars.

The transmitted pulse 116 and the echo pulses 117 and 118, reflected from stations 63 and 62, respectively, are rectified by receiver 97. These rectified pulses are conducted to the modulating grid of cathode-ray tube 98 and cause the electron beam momentarily to increase in intensity. The fluorescent spot on the screen of cathode-ray tube 98 is caused to rotate in a circle by quarter-phase currents derived from an oscillator in block 99, the frequency of which is locked to that of the output of block 71 or 2330 cycles per second. One revolution of the spot in the circular path corresponds to a radar distance of 40 miles. The angular positions of the intensified dots produced by echo pulses 117 and 118, shown in the second frame of Fig. 8, give the fractions of 50 miles for each range which must be added to the whole number of 40 miles within each range as indicated by the number of 40 mile circles inside the range dots on the P.P.I. display indicated in the first frame of Fig. 8.

The original marker pulse 113 trips a single-shot multivibrator in block 100. The pulse produced while this multivibrator persists in its unstable phase has a duration sufficient to encompass the initial pulse 116 and the two echo pulses 117 and 118, and is indicated as pulse 119 in Fig. 6. Pulse 119 unblanks the electron beam in cathode-ray tube 98.

The display on the screen of cathode-ray tube 98, shown in the second frame in Fig. 8, is photographically recorded on film 92.

The termination of pulse 114 from block 90 produces in block 101 pulse 120 which trips the film-advance mechanism in block 102 and advances film 92 after projector 76 has made one complete revolution from the time when the marker pulse 113 occurs.

The special event transmitted over line 103 may be recorded by a third cathode-ray tube 104 or by any other means such as a camera. The record may be made on film 105, which is advanced by the mechanism in block 106 in response to a pulse from block 107 controlled by pulse 119 from block 100. Cathode-ray tube 104 is unblanked by the same pulse which unblanks tube 98.

The time expressed in hours, minutes, and seconds, or some other identifying number, given by timing devices 108, is simultaneously recorded on films 92 and 105 each time a radar pulse 116 is emitted, which occurs at the termination of pulse 115 produced in block 93. This time record is photographed on the margin as indicated in the first and third frames of Fig. 8.

Although only a few of the various forms in which this invention may be embodied have been shown herein, it is to be understood that the invention is not limited to any specific construction but may be embodied in various forms.

What is claimed is:

1. A radar locating system comprising a pair of ground stations of known positions and separated by a known distance, a radar transmitter at one of said stations to transmit a radar pulse to a movable object to be located, radar receiving means at said transmitting station to receive the echo pulse from said movable object, said radar receiving means including a pair of cathode-ray tubes, means connected to form a cathode-ray spot on the screen of one of said tubes having an angular position corresponding to the orientation of said movable object and disposed at a distance from the center of said screen corresponding to the range of said movable object, means rotating the beam in the other of said tubes a plurality of times during the period of time between the transmission of the radar pulse and the receipt of the said echo pulse, means producing on the screen of said other tube circular indications successively spaced from the center of said screen to indicate the echo distance corresponding to each rotation of the beam in said second tube, and means indicating on the screen of said second tube the angular displacement of the echo pulse with respect to the transmitted pulse, whereby the number of said indications on said last screen between said center and said echo pulse represents the number of complete revolutions of the beam in said second tube to be added to the angular displacement of the spots in said second tube for determining the range of said movable object from the said transmitting station, and means at the other of said ground stations to receive an echo radar pulse from said movable object, means relaying said last echo pulse from said second mentioned ground station to said transmitting station, and means connected to produce a second spot on each of said cathode-ray tube screens having displacements corresponding to one half the sum of the ranges of said movable object from said two ground stations and the distance between said ground stations.

2. In a system as set forth in claim 1, means in said transmitting station to photographically record the images on the screens of said two cathode-ray tubes, and means in said movable object to transmit a recording signal, and means responsive to said signal to cause the said recording to be made and simultaneously to actuate photographic means for recording the terrain below the movable object, and means in said transmitting station recording a time signal simultaneously with said other recordings.

3. A radar locating system comprising a pair of ground stations of known positions separated by a known distance and a movable object to be located, two radar means at one of said stations, the first radar means including means producing and transmitting to said movable object a series of radar pulses, means receiving echo pulses from said movable object, means whereby received echo pulses serve to direct the transmission of said radar pulses in the direction of the movable object, a cathode ray tube having a screen, means producing a spot on said screen of said tube for each transmitted pulse having an angular position and a displacement from the center of said tube screen corresponding to the bearing and range of said movable object and said screen of said tube being provided with a series of concentric circles spaced radially a distance corresponding to a certain range interval, said second radar means including means producing and transmitting a radar pulse in the direction of said movable object at a predetermined time, means receiving an echo pulse from said movable object including a second cathode-ray tube, means rotating the beam in said second cathode-ray tube a plurality of times during the period of time between the transmission of the radar pulse and the reception of the echo pulse such that the time of one revolution of said beam corresponds to the said range interval, means causing said received echo pulse to produce a spot on the screen of said second tube having an angular displacement with respect to the spot produced by the transmitted radar pulse, whereby the number of said circles between said center and said echo pulse spot on said first tube screen represents the number of complete revolutions of the beam in said second tube to be added to said angular displacement of the spots in said second tube for determining the range of said movable object from said transmitting station, means at the said second ground station to receive an echo radar pulse from said movable object, means relaying said last echo pulse to said first ground station, means connected to produce a second echo spot on said first and second cathode ray tube screens having positions representing one-half the sum of the ranges from the movable object to the said two ground stations and the distance between the said ground stations, and means at the movable object to produce a signal pulse at said predetermined time whereby the radar pulse of said second radar means is initiated.

References Cited in the file of this patent

UNITED STATES PATENTS

| | | |
|---|---|---|
| 2,448,016 | Busignies | Aug. 31, 1948 |
| 2,512,703 | Wilkerson | June 27, 1950 |
| 2,746,034 | Hasbrook | May 15, 1956 |

FOREIGN PATENTS

| | | |
|---|---|---|
| 622,101 | Great Britain | Apr. 27, 1949 |